United States Patent
Marti Sala et al.

(10) Patent No.: US 9,452,898 B2
(45) Date of Patent: Sep. 27, 2016

(54) ROTARY CONVEYOR WITH CHANGE OF PITCH FOR TRANSFERRING CONTAINERS

(71) Applicants: Jaime Marti Sala, Barcelona (ES); Alex Marti Mercade, Barcelona (ES)

(72) Inventors: Jaime Marti Sala, Barcelona (ES); Alex Marti Mercade, Barcelona (ES)

( * ) Notice: Subject to any disclaimer, the term of this patent is extended or adjusted under 35 U.S.C. 154(b) by 0 days.

(21) Appl. No.: 14/950,334

(22) Filed: Nov. 24, 2015

(65) Prior Publication Data
US 2016/0145056 A1    May 26, 2016

(51) Int. Cl.
| | |
|---|---|
| *B65G 29/00* | (2006.01) |
| *B65G 47/84* | (2006.01) |
| *B65G 47/91* | (2006.01) |
| *B65G 47/22* | (2006.01) |

(52) U.S. Cl.
CPC ............ *B65G 47/914* (2013.01); *B65G 29/00* (2013.01); *B65G 47/22* (2013.01); *B65G 47/848* (2013.01); *B65G 47/915* (2013.01)

(58) Field of Classification Search
CPC .. B65G 47/914; B65G 47/918; B65G 47/91; B65G 47/915; B65G 47/22; B65G 29/00; B65G 47/848; B65G 47/904
USPC ................ 198/377.04, 377.08, 471.1, 803.5, 198/457.07, 459.2, 478.1, 479.1, 722, 723
See application file for complete search history.

(56) References Cited

U.S. PATENT DOCUMENTS

| | | | | |
|---|---|---|---|---|
| 4,726,876 A | * | 2/1988 | Tomsovic, Jr. ... | A61F 13/15601 156/552 |
| 5,058,731 A | * | 10/1991 | Corniani ............. | B65G 47/848 198/803.11 |
| 5,151,001 A | * | 9/1992 | Kawaguchi ......... | B23Q 1/5468 198/377.08 |
| 6,832,679 B2 | * | 12/2004 | Berndtsson ........... | G06K 13/08 198/471.1 |
| 8,720,666 B2 | * | 5/2014 | Papsdorf .......... | A61F 13/15764 198/377.01 |
| 8,739,961 B2 | * | 6/2014 | Marti Sala .......... | B65G 47/848 198/471.1 |
| 9,027,736 B2 | * | 5/2015 | Lanfranchi ......... | B65G 47/848 198/377.04 |

* cited by examiner

*Primary Examiner* — Mark A Deuble
(74) *Attorney, Agent, or Firm* — Eugenio J. Torres; Victor Rodriguez; Ferraiuoli LLC

(57) ABSTRACT

The rotary conveyor with change of pitch for transferring containers comprises a plurality of slides (5) radially guided on a rotary platform (1) rotating about a rotation axis (E) and on which a suction chamber (9) having a plurality of side openings (11) is fixed. A stationary closed-loop cam (4) not centered with respect to the rotation axis (E) is located below the rotary platform (1). Each slide (5) has fixed thereto a retention element (7) provided with a suction port (8) suitable for retaining a container and a suction conduit (10) having an outer open end connected to the suction port (8), an inner open end located inside the suction chamber (9), and an intermediate portion slidingly inserted in a corresponding one of the side openings (11) of the suction chamber (9).

13 Claims, 4 Drawing Sheets

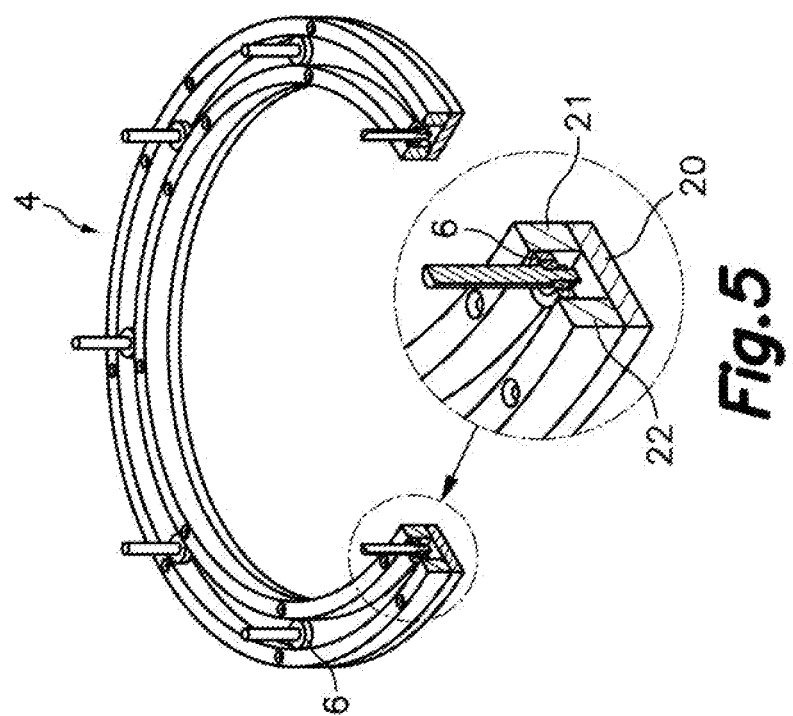
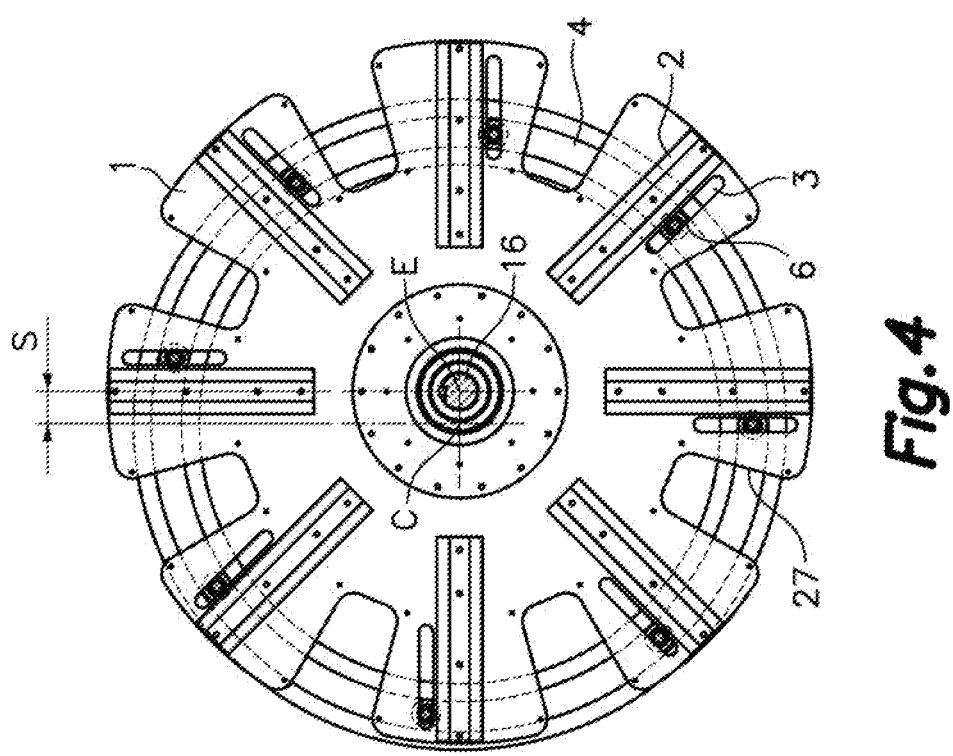

ROTARY CONVEYOR WITH CHANGE OF PITCH FOR TRANSFERRING CONTAINERS

CROSS-REFERENCE TO RELATED APPLICATIONS

This application claims priority from European Application No. EP14380036 filed on Nov. 24, 2014.

FIELD OF THE INVENTION

The present invention relates to a rotary conveyor with change of pitch useful for transferring containers from an infeed conveyor to an outfeed conveyor, where the containers are conveyed by the infeed conveyor at a first pitch, i.e., separated from one another by a first distance, and delivered to the outfeed conveyor at a second pitch, i.e., separated from one another by a second distance, different from the first pitch.

BACKGROUND OF THE INVENTION

Document EP 2226277 B1 discloses a rotary conveyor for transferring containers comprising a rotor driven by a motor to rotate around rotation axis. The rotor has a perimetric wall having a plurality of suction openings distributed over its periphery in correspondence with retention elements configured to engage the containers. In a region inside the perimetric wall of the rotor there is a stationary suction chamber connected to a low pressure source. The suction chamber defines a laterally open channel facing the perimetric wall along a predetermined arc of circumference, so that the suction chamber is delimited in part by the perimetric wall of the rotor so that when the rotor rotates the suction openings communicate directly with the suction chamber along the predetermined arc of circumference. As the rotor rotates, a container is held by suction in each of the retention elements at the start of the predetermined arc of circumference, is carried by the rotor along the predetermined arc of circumference, and is released at the end of the predetermined arc of circumference.

Document EP 2722296 A1 discloses a rotary conveyor with change of pitch for transferring containers, comprising a rotary platform rotating about a rotation axis, a plurality of guide elements fixed to the rotary platform and a plurality of slots parallel to the guide elements formed in the rotary platform. The guide elements and the slots are uniformly distributed around the rotation axis and extend from a peripheral region to a central region of the rotary platform. A stationary closed-loop cam defining a path not centered with respect to the rotation axis is located below the rotary platform. Each guide element has coupled thereto a slide provided with a cam follower inserted through the corresponding slot and coupled to the closed-loop cam, such that each slide performs a back and forth movement along the corresponding guide element during one rotation of the rotary platform.

In the rotary conveyor of the mentioned document EP 2722296 A1, each slide has fixed thereto a retention element provided with a suction port suitable for retaining a container, and each suction port is in communication with a suction chamber through a corresponding suction conduit. The suction chamber is located in a stationary position below the rotary platform and has an upper wall in contact with a lower surface of the rotary platform. The closed-loop cam and a suction slot parallel to a portion of the path defined by the closed-loop cam are formed in this upper wall of the suction chamber. The suction conduit of each slide has an open lower end which communicates with the suction chamber through an intersection of the corresponding slot formed in the rotary platform and the suction slot formed in the suction chamber, and this open lower end of the suction conduit follows the changing position of the mentioned intersection during the back and forth movement of the slide during a part of each rotation of the rotary platform.

The rotary conveyor of the mentioned document EP 2722296 A1 has several drawbacks. First, the fact that the upper wall of the suction chamber is in contact with a lower surface of the rotary platform can generate considerable friction resulting in unacceptable component wear and/or heating. Furthermore, the fact that both the closed-loop cam and the suction slot are formed in the upper wall of the suction chamber makes it necessary to replace the entire suction chamber when only the path of the closed-loop cam is to be modified. On the other hand, the fact of using the slots formed in the rotary platform both for the passage of the corresponding cam followers and for the passage of air at their intersections with the suction slot requires high precision in the paths of the closed-loop cam, the slots formed in the rotary platform and the suction slot for obtaining an acceptable air flow rate in any position without considerable losses, which imposes certain limitations in the design of such paths.

SUMMARY OF THE INVENTION

The present invention contributes to mitigate the foregoing and other drawbacks by providing a rotary conveyor with change of pitch for transferring containers which comprises a rotary platform rotating about a rotation axis, a plurality of guide elements fixed to said rotary platform, and a plurality of slots formed in the rotary platform in positions parallel to the guide elements, where both the guide elements and the slots are uniformly distributed around the rotation axis and extend from a peripheral region to a central region of the rotary platform. A closed-loop cam defining a path not centered with respect to the rotation axis is located in a stationary position below the rotary platform.

The rotary conveyor furthermore includes a plurality of slides, each of which is slidingly coupled to one of the guide elements and provided with a cam follower inserted through one of the mentioned slots and coupled to the closed-loop cam, whereby each slide performs a back and forth movement along the corresponding guide element during one rotation of the rotary platform.

Each of the slides has fixed thereto a retention element provided with a suction port suitable for retaining a container, and each suction port is in communication with a suction chamber through a corresponding suction conduit fixed to the slide in a position parallel to the corresponding guide element.

The mentioned suction chamber is fixed on the rotary platform such that it rotates together with the rotary platform, and has a plurality of side openings uniformly distributed around the rotation axis. Each suction conduit has an outer open end connected to the corresponding suction port, an inner open end located inside the suction chamber, and an intermediate portion slidingly inserted in one of said side openings of the suction chamber.

With this construction and as a result of the back and forth movement of the slides, the distance between each retention element and the rotation axis changes from an outer limit position to an inner limit position and again to the outer limit position during each complete rotation of the rotary platform while the respective conduits slide towards and away from the suction chamber, assuring the passage of air between the corresponding suction ports and the suction chamber.

Therefore, the rotary conveyor receives in a first angular position successive containers conveyed by an infeed conveyor at a first pitch, i.e., separated from one another by a first distance, and delivers them in a second angular position to an outfeed conveyor at a second pitch, i.e., separated from one another by a second distance, different from the first pitch.

The speeds at which each slide moves between the outer and inner limit positions as well as the amplitude of the back and forth movement are determined by the non-centered path of the closed-loop cam. In one embodiment, the path not centered with respect to the rotation axis defined by the closed-loop cam is a circumferential path having a center located at an off-center distance from the rotation axis of the rotary platform. In this case, the amplitude of the back and forth movement is equal to two times the mentioned off-center distance.

Given that the closed-loop cam is independent of the suction chamber, when speeds and amplitude of the back and forth movement of the slides are to be changed, a closed-loop cam can simply be replaced with another one suited to the new needs without having to replace or modify the suction chamber at all.

Each side opening of the suction chamber preferably has installed therein a sliding bearing made of a low-friction material, and this sliding bearing is sized such that it fits over an outer surface of the corresponding suction conduit allowing sliding at the same time. Friction is thus reduced and excessive air losses are prevented.

Optionally, a plurality of air restricting walls are located inside the suction chamber and fixed to the rotary platform in positions regularly distributed around the rotation axis, and each of these air restricting walls is facing the inner open end of one of the suction conduits. During rotation of the rotary platform, the open end of each suction conduit gradually moves closer to the corresponding air restricting wall, whereby the air restricting wall gradually restricts the passage of air through the inner open end of the suction conduit as the corresponding slide moves from an outer limit position to an inner limit position in said back and forth movement along the corresponding guide element. Then the open end of each suction conduit gradually moves away from the corresponding air restricting wall, whereby the air restricting wall gradually allows an increased passage of air through the inner open end of the suction conduit as the corresponding slide moves from the inner limit position to the outer limit position until reaching the initial position.

The suction chamber is located in a central position of the rotary platform and connected to a low pressure source by means of a rotary coupling coaxial with the rotation axis. Preferably, both the mentioned rotary coupling and the suction conduits connecting the suction ports with the suction chamber have respective diameters sized for allowing air flows at a relatively high flow rate and at a relatively slow speed, which is suitable for retaining the containers by suction in the retention elements. This relatively high flow rate at a relatively slow speed can be readily obtained by means of a fan operated by a motor, such as an electric motor, of relatively low power and with moderate power consumption.

BRIEF DESCRIPTION OF THE DRAWINGS

The foregoing and other advantages and features will be better understood from the following detailed description of a merely illustrative and non-limiting embodiment with reference to the accompanying drawings, in which:

FIG. 4 is a top view of the rotary platform and the closed-loop cam; and

FIG. 5 is a quarter-sectioned perspective view of the closed-loop cam interacting with the cam followers.

DETAILED DESCRIPTION OF THE EXEMPLARY EMBODIMENT

Figure 1:
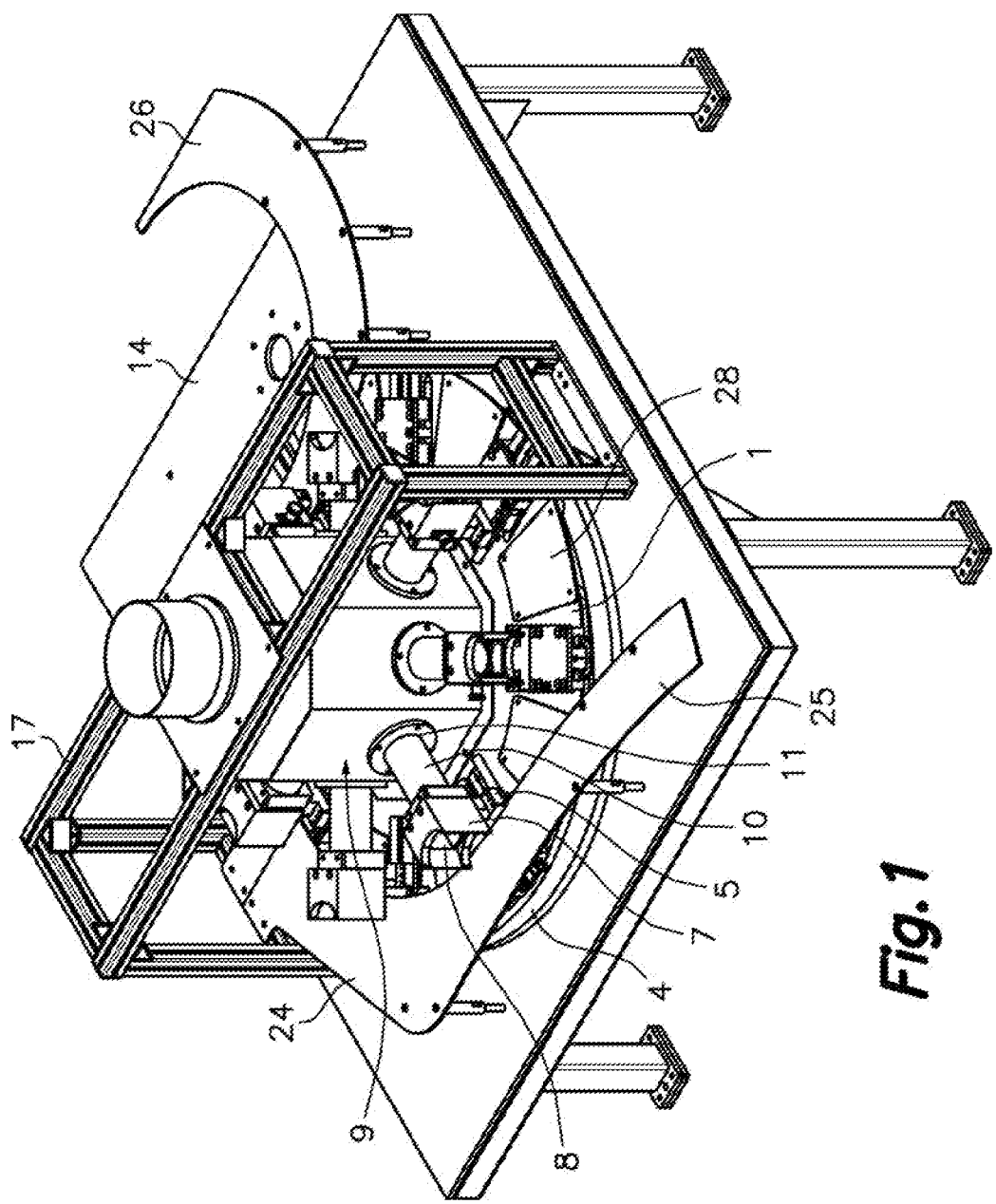
FIG. 1 is a perspective view of a rotary conveyor with change of pitch for transferring containers according to an embodiment of the present invention.
Figure 2:
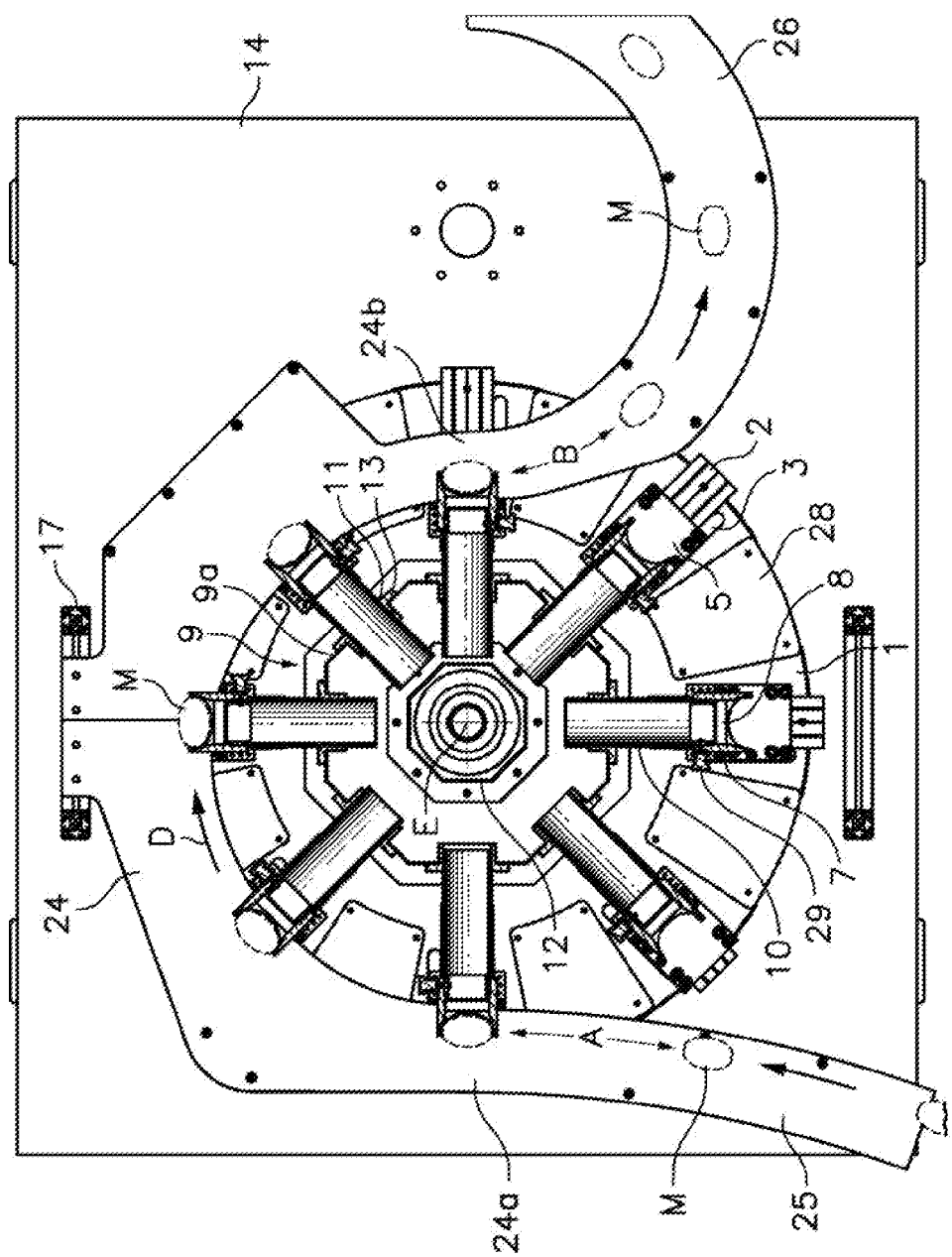
FIG. 2 is a top view of the rotary conveyor of FIG. 1 sectioned by a horizontal plane at the level of the suction conduits.
Figure 3:
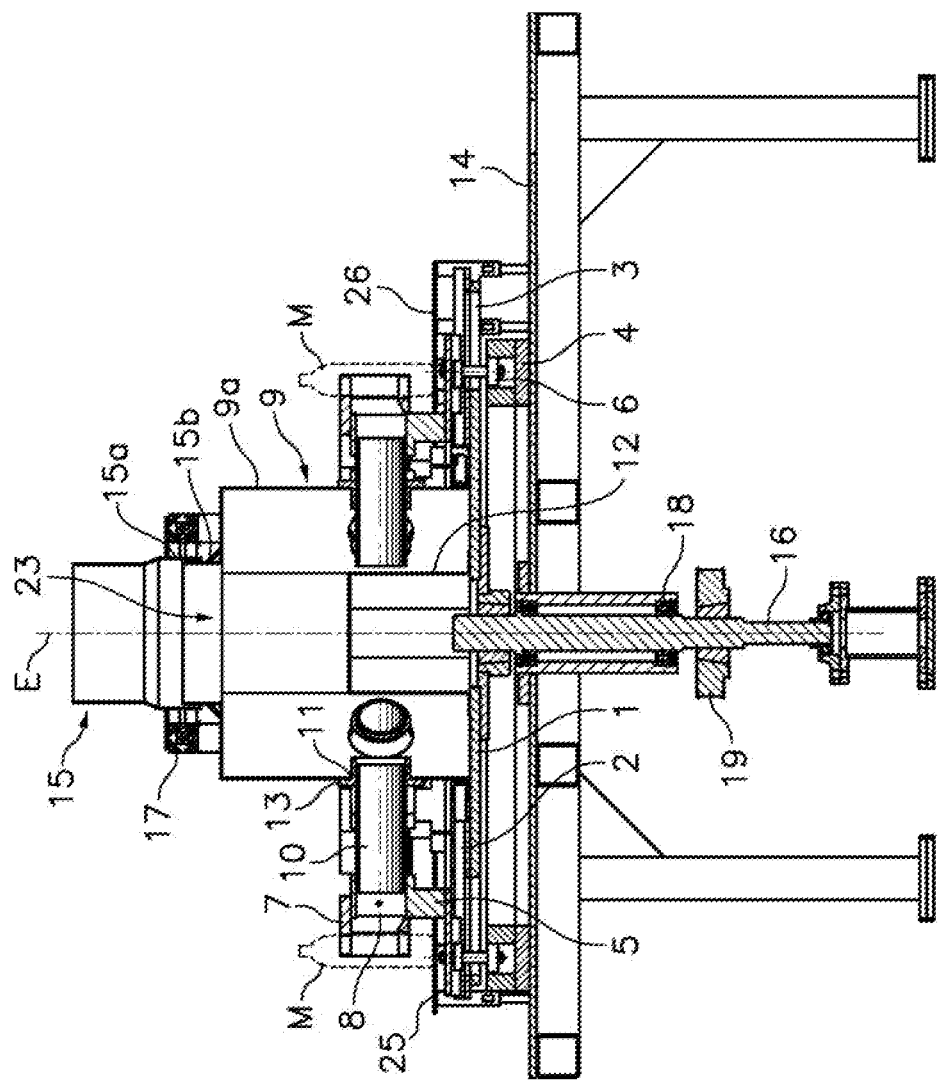
FIG. 3 is a cross-section view of the rotary conveyor of FIG. 1, taken in a vertical plane containing the rotation axis of the rotary platform.

FIGS. 1, 2 and 3 show a rotary conveyor with change of pitch for transferring containers according to an embodiment of the present invention comprising a frame 14 including a horizontal surface on which a closed-loop cam 4 is fixed in a stationary position. The frame 14 furthermore supports a drive shaft 16 by means of ball bearings 18 (FIG. 3), such that the drive shaft 16 can rotate about a vertical rotation axis E. The drive shaft 16 has fixed thereto a driven pulley 19 (FIG. 3) which is part of a mechanical transmission connecting the driven pulley 19 fixed to the drive shaft 16 to a driving pulley (not shown) operatively connected to be driven by a motor (not shown) so that the motor rotates the drive shaft 16.

An upper end of the drive shaft 16 is fixed to a rotary platform 1 located above the closed-loop cam 4, such that the rotary platform 1 rotates together with drive shaft 16 about the rotation axis E in the direction indicated by arrow D in FIG. 2.

As shown in FIG. 4, the closed-loop cam 4 defines a circumferential path having a center C not centered with respect to the rotation axis E. In fact, the center C of the circumferential path of the closed-loop cam 4 is located at an off-center distance S from the rotation axis E of the rotary platform 1. It must be pointed out that although the drawings show a closed-loop cam having a circumferential path, the closed-loop cam could alternatively define other non-circular and non-centered paths with respect to the rotation axis E of the rotary platform 1 with an equivalent result.

A plurality of guide elements 2 uniformly distributed around the rotation axis E are fixed on an upper surface of the rotary platform 1, and a plurality of slots 3 are formed through the rotary platform 1, each slot 3 being located in a position parallel and adjacent to one of the guide elements 2. Both the guide elements 2 and the slots 3 extend from a peripheral region to a central region of the rotary platform 1, as best shown in FIG. 4. In the illustrated example, the guide elements 2 are arranged in radial positions.

Each of the guide elements 2 has a slide 5 slidingly coupled thereto, and the slide 5 has a downwardly projecting cam follower 6 fixed thereto and inserted through the corresponding slot 3. The cam followers 6 of all the slides 5 are coupled to the closed-loop cam 4 (FIGS. 3 and 4), such that when the rotary platform rotates about the rotation axis E, and by virtue of the eccentricity of the closed-loop cam 4, each slide 5 performs a back and forth movement along the corresponding guide element 2 during one rotation of the rotary platform 1.

As best shown in FIG. 5, in the illustrated embodiment the closed-loop cam 4 is formed by an annular base piece 20 on which an annular inner piece 21 and an annular outer piece 22 are fixed, defining therebetween a slot provided with opposing side surfaces provided by the annular inner and outer pieces 21, 22. Each cam follower 6 comprises a freely rotating wheel rolling alternately on the side surface provided by the annular outer piece 22 and on the side surface provided by the annular inner piece 21 of the closed-loop cam 4 during one complete rotation of the rotary platform 1. In alternative embodiments (not shown), the closed-loop cam and cam followers can have other configurations and/or constructions well known in the art with an equivalent result.

A suction chamber 9 having side walls 9a arranged in a polygonal shape is fixed in a central position on the rotary platform 1, and each of the side walls 9a of the suction chamber 9 is perpendicular to one of the guide elements 2 and has a corresponding side opening 11 formed therein.

The suction chamber 9 has an upper opening 23 connected to a low pressure source (not shown) by a rotary coupling 15 coaxial with the rotation axis E. This rotary coupling 15 has a static part supported in a stationary position by a bridge-shaped structure 17 fixed to the frame 14 and arranged above the suction chamber 9 (FIG. 1), and a rotating part fixed to the suction chamber 1. The static part of the rotary coupling 15 has configured to be connected, for example, to an end of a duct (not shown) the other end of which is connected to the low pressure source.

As shown in FIG. 3, the static part of the rotary coupling 15 comprises a cylindrical skirt 15a coaxial with the rotation axis E in which there is inserted a cylindrical tubular portion 15b fixed around the upper opening 23 of the suction chamber 9, where the cylindrical tubular portion 15b forms the rotating part of the rotary coupling 15. The cylindrical tubular portion 15b and the cylindrical skirt 15a fit with one another without interference in a relatively loose manner, assuring friction-free relative rotation with minimal air losses.

Each of the slides 5 has fixed thereto a retention element 7 provided with a suction port 8 suitable for retaining a container M. Each suction port is in communication with the suction chamber 9 through a corresponding suction conduit 10 fixed to the slide 5. Each of the suction conduits 10 is arranged in a position parallel to the corresponding guide element 2 and has an outer open end connected to the corresponding suction port 8, an inner open end located inside the suction chamber 9, and an intermediate portion slidingly inserted in one of the side openings 11 of the suction chamber 9 (FIGS. 2 and 3).

A sliding bearing 13 made of a low-friction material is installed in each side opening 11 of the suction chamber 9, wherein the sliding bearing 13 fits over an outer surface of the corresponding suction conduit 10 and facilitates sliding thereof while at the same time minimizes air losses.

As best shown in FIG. 2, along a portion of the circumference of the rotary platform 1 and partially below the retention elements 7, the frame 14 supports a support surface 24 on which containers M are slid when they are conveyed by the rotary conveyor with change of pitch from a gripping point 24a, in which one of the retention elements 7 grips a container M from an infeed conveyor, to a delivery point 24b, in which this retention element 7 releases the container M to an outfeed conveyor.

The infeed and outfeed conveyors have respective support surfaces 25, 26 at the same level as the support surface 24 of the rotary conveyor with change of pitch. The support surfaces 24, 25, 26 are associated with known stationary baffling elements and railing elements (not shown) cooperating in guiding containers M. In the illustrated embodiment, it is envisaged that the outfeed conveyor is a conventional rotary conveyor having a fixed pitch (not shown), although it may alternatively be of any other type.

As illustrated in FIG. 2, containers M are conveyed in the infeed conveyor at a first pitch A, i.e., separated from one another by a first distance, and are delivered by virtue of the back and forth movement of the slides 5 to the outfeed conveyor at a second pitch B, i.e., separated from one another by a second distance, the second pitch B being shorter than the first pitch A.

At the gripping point 24a, the slides 5 are located in an outer limit position (shown on the left side in FIGS. 2 and 3), whereas at the delivery point 24b, the slides 5 are located in an inner limit position (shown on the right side in FIGS. 2 and 3) in relation to the back and forth movement thereof along the corresponding guide element 2. Therefore, the radius of rotation of the slides 5 gradually decreases along the first portion of the rotation of the rotary platform 1, and subsequently the length of the arch between two retention elements 7, equivalent to the pitch, is shortened accordingly. The amplitude of the back and forth movement is selected such that the rotary conveyor with change of pitch grips the containers M at a pitch equivalent to the first pitch A and delivers the containers M at a pitch equivalent to the second pitch B.

Inside the suction chamber 9 there is a plurality of air restricting walls 12 parallel to the side walls 9a, such that each of the air restricting walls 12 is facing the inner open end of one of the suction conduits 10. The distance between the air restricting walls 12 and the side walls 9a of the suction chamber 9 is selected according to the amplitude of the back and forth movement of the slides 5, which in this case is equivalent to twice the off-center distance S (FIG. 4).

Therefore, when a slide 5 is located in the outer limit position (shown on the left side in FIGS. 2 and 3), the inner open end of the corresponding suction conduit 10 is located away from the corresponding air restricting wall 12, so the air restricting wall 12 does not noticeably restrict the passage of air through the inner open end of the suction conduit 10 and suction through the corresponding suction port 8 is maximum, which is appropriate given that this outer limit position corresponds with the gripping point 24a where the retention element 7 must grip the container M.

When the slide 5 is located in the inner limit position (shown on the right side in FIGS. 2 and 3), the inner open end of the corresponding suction conduit 10 is located very close to the corresponding air restricting wall 12, so the air restricting wall 12 to a large extent or almost completely restricts the passage of air through the inner open end of the suction conduit 10, and suction through the corresponding suction port 8 is minimal, which is also appropriate given that this inner limit position corresponds with the delivery point 24a where the retention element 7 must release the container M.

Throughout rotation from the gripping point 24a to the delivery point 24b, the open end of each suction conduit 10 gradually moves closer to the corresponding air restricting wall 12, so the air restricting wall 12 gradually restricts the passage of air through the inner open end of the suction conduit 10, and throughout rotation from the delivery point 24b to the gripping point 24a, the inner open end of each suction conduit 10 gradually moves away from the corresponding air restricting wall 12, so the air restricting wall 12 gradually allows the passage of air through the inner open end of the suction conduit 10.

It must be pointed out that the rotary conveyor with change of pitch of the present invention can work without air restricting walls and in cooperation with stationary baffling elements (not shown) arranged for detaching the containers M from the retention elements 7 at the delivery point 24*b*. Furthermore, the rotary conveyor with change of pitch and without air restricting walls can work inversely with respect to what is illustrated in FIG. 2, i.e., rotating in a direction that is the inverse of the direction indicated by means of arrow D for receiving containers M at a first pitch (pitch B in FIG. 2) which is shorter than a second pitch (pitch A in FIG. 2) at which containers M are delivered.

The amplitude of the back and forth movement of the slides 5 can be changed to adapt the rotary conveyor to different pitches, replacing the closed-loop cam 4 with another one that defines a different path. To that end, the closed-loop cam 4 is formed by two or more segments and the rotary platform 1 has wide notches 27 (FIG. 4) providing access to the closed-loop cam 4 and fixing elements (not shown) fixing the two or more segments forming the closed-loop cam 4 to the frame 14. During operation, the notches 27 are covered by removable covers 28 (FIGS. 1 and 2).

The retention elements 7 can also be replaced with other retention elements to adapt the rotary conveyor to containers of different types. To that end, each retention element 7 is fixed to the corresponding slide by means of one or more manually-operated releasable fixing elements 29 (FIG. 2).

The scope of the present invention is defined in the attached claims.

What is claimed is:

1. A rotary conveyor with change of pitch for transferring containers, comprising:
    a rotary platform rotating about a rotation axis;
    a plurality of guide elements fixed to said rotary platform and a plurality of slots formed in the rotary platform in positions parallel to said guide elements, where the guide elements and said slots are uniformly distributed around said rotation axis and extend from a peripheral region to a central region of the rotary platform;
    a closed-loop cam located in a stationary position below the rotary platform, said closed-loop cam defining a path not centered with respect to the rotation axis;
    a plurality of slides, each being slidingly coupled to one of said guide elements and provided with a cam follower inserted through one of said slots and coupled to said closed-loop cam, where each slide performs a back and forth movement along the corresponding guide element during one rotation of the rotary platform;
    a plurality of retention elements, each being fixed to one of said slides and provided with a suction port suitable for retaining a container, each suction port being in communication with a suction chamber through a suction conduit;
    characterized in that:
    said suction chamber is fixed on the rotary platform and has a plurality of side openings;
    each of the slides has one of said suction conduits fixed thereto in a position parallel to the corresponding guide element; and
    each suction conduit has an open outer end connected to the corresponding suction port, an inner open end located inside the suction chamber, and an intermediate portion slidingly inserted in one of said side openings of the suction chamber.

2. The rotary conveyor with change of pitch according to claim 1, characterized in that a plurality of air restricting walls are located inside the suction chamber, where each of said air restricting walls is facing the inner open end of one of the suction conduits and the inner open end of each suction conduit gradually moves closer to the corresponding air restricting wall, whereby the air restricting wall gradually restricts the passage of air through the inner open end of the suction conduit, as the corresponding slide moves from an outer limit position to an inner limit position in said back and forth movement along the corresponding guide element during rotation of the rotary platform.

3. The rotary conveyor with change of pitch according to claim 1, characterized in that each side opening of the suction chamber has installed therein a low-friction sliding bearing which fits over an outer surface of the corresponding suction conduit.

4. The rotary conveyor with change of pitch according to claim 1, characterized in that said path not centered with respect to the rotation axis defined by the closed-loop cam is a circumferential path having a center located at an off-center distance from the rotation axis of the rotary platform.

5. The rotary conveyor with change of pitch according to claim 1, characterized in that the closed-loop cam defines a slot provided with opposing side surfaces, and said cam follower comprises a wheel rolling alternately on both of said side surfaces of the closed-loop cam during one rotation of the rotary platform.

6. The rotary conveyor with change of pitch according to claim 1, characterized in that the suction chamber is connected to a low pressure source by a rotary coupling coaxial with the rotation axis.

7. The rotary conveyor with change of pitch according to claim 1, characterized in that the closed-loop cam is fixed to a frame, which in turn supports a drive shaft coaxial with the rotation axis and fixed to the rotary platform.

8. The rotary conveyor with change of pitch according to claim 6, characterized in that said frame further supports a bridge-shaped structure arranged above the suction chamber, and said bridge-shaped structure supports a static part of a rotary coupling coaxial with the rotation axis, where said rotary coupling connects the suction chamber to a low pressure source.

9. The rotary conveyor with change of pitch according to claim 7, characterized in that said static part of the rotary coupling comprises a cylindrical skirt coaxial with the rotation axis in which there is inserted a cylindrical tubular portion fixed to the suction chamber around an upper opening thereof, said cylindrical tubular portion and said cylindrical skirt fitting with one another without interference.

10. The rotary conveyor with change of pitch according to claim 6, characterized in that said drive shaft is connected by a mechanical transmission to a motor which rotates the drive shaft together with the rotary platform.

11. The rotary conveyor with change of pitch according to claim 4, characterized in that the closed-loop cam defines a slot provided with opposing side surfaces, and said cam follower comprises a wheel rolling alternately on both of said side surfaces of the closed-loop cam during one rotation of the rotary platform.

12. The rotary conveyor with change of pitch according to claim 4, characterized in that the closed-loop cam is fixed to a frame, which in turn supports a drive shaft coaxial with the rotation axis and fixed to the rotary platform.

13. The rotary conveyor with change of pitch according to claim 12, characterized in that said static part of the rotary coupling comprises a cylindrical skirt coaxial with the rotation axis in which there is inserted a cylindrical tubular portion fixed to the suction chamber around an upper opening thereof, said cylindrical tubular portion and said cylindrical skirt fitting with one another without interference.

* * * * *